United States Patent [19]

Freeman

[11] Patent Number: 4,849,147
[45] Date of Patent: Jul. 18, 1989

[54] METHOD OF MAKING A MOLDED STRUCTURE HAVING INTEGRALLY FORMED ATTACHMENT MEMBERS

[75] Inventor: Richard B. Freeman, Oxford, Mich.

[73] Assignee: The Budd Company, Troy, Mich.

[21] Appl. No.: 190,055

[22] Filed: May 4, 1988

Related U.S. Application Data

[63] Continuation-in-part of Ser. No. 136,187, Dec. 21, 1987, which is a continuation of Ser. No. 768,259, Aug. 22, 1985, abandoned.

[51] Int. Cl.[4] .................... B29C 45/14; B32B 31/04
[52] U.S. Cl. .................... 264/138; 29/525.1; 264/257; 264/258; 264/296; 264/314
[58] Field of Search ............ 264/138, 163, 257, 258, 264/294, 295, 296, 314, 512, 516; 29/460, 469, 469.5, 526.1, 527.2, 527.4; 296/31 P, 191

[56] References Cited

U.S. PATENT DOCUMENTS

| | | | |
|---|---|---|---|
| Re. 25,241 | 9/1962 | Randolph | 264/258 |
| 3,128,322 | 4/1964 | Young | 264/314 |
| 3,188,730 | 6/1965 | Meyer | 29/526.1 X |
| 3,610,087 | 10/1971 | Dritz | 29/526.1 X |
| 3,705,931 | 12/1972 | Confer et al. | 264/516 X |
| 3,832,109 | 8/1974 | Ranallo et al. | 264/257 X |
| 3,937,781 | 2/1976 | Allen | 264/314 |
| 3,967,996 | 7/1976 | Kamov et al. | 264/258 X |
| 4,126,659 | 11/1978 | Blad | 264/314 X |
| 4,213,933 | 7/1980 | Cambio | 264/516 X |
| 4,272,878 | 6/1981 | Danforth | 29/526.1 |
| 4,314,964 | 2/1982 | Ferrary | 264/516 X |
| 4,338,070 | 7/1982 | Nava | 425/112 |
| 4,342,799 | 8/1982 | Schwochert | 264/516 X |
| 4,446,092 | 5/1984 | Bliley | 264/258 |
| 4,483,731 | 11/1984 | Dohle et al. | 264/314 X |
| 4,530,147 | 7/1985 | Mattei et al. | 29/526.1 X |
| 4,597,153 | 7/1986 | Zaydel | 29/526.1 X |
| 4,724,115 | 2/1988 | Freeman | 264/314 X |
| 4,740,346 | 4/1988 | Freeman | 264/258 |

Primary Examiner—Jeffery Thurlow
Assistant Examiner—Leo B. Tentoni
Attorney, Agent, or Firm—Harness, Dickey & Pierce

[57] ABSTRACT

A method of making a hollow fiber reinforced plastic structure with integrally molded fastening devices for attaching external components. The fastening device is attached to a piece of fibrous material into which resin is injected. The finger holds the fastening device in place during the resin injection step. The resin is cured to form a molded structure with the fastening device lying on an outer surface thereof. After removal from the mold, the fastening device can be used to attach external components to the part.

14 Claims, 3 Drawing Sheets

METHOD OF MAKING A MOLDED STRUCTURE HAVING INTEGRALLY FORMED ATTACHMENT MEMBERS

CROSS REFERENCE TO RELATED APPLICATIONS

This application is a continuation-in-part application of U.S. Ser. No. 136,187, filed Dec. 21, 1987 which is a continuation application of U.S. Ser. No. 768,259, filed Aug. 22, 1985 entitled "Hollow Fiber Reinforced Structure and Method of Making Same", now abandoned.

BACKGROUND

1. Technical Field

This invention relates to resin transfer molding and products resulting therefrom.

2. Discussion

Fiber reinforced plastic (FRP) parts are being increasingly considered for use in a wide variety of applications. As discussed in the above-identified applications, which are hereby incorporated by reference, it has been relatively difficult to mold complex shapes in which a plurality of asymmetrical members meet at one or more joints. An example of such a shape is an automobile door frame. The method disclosed in the above-referenced applications provides an efficient, cost effective procedure for molding such complex parts.

It is often desirable to attach external components to such molded structures. For example, it is sometimes necessary to secure hoses, electrical wiring, insulation and the like to vehicle doors, wheel wells, firewalls, etc. It is a fairly easy task to secure these components if they are made of metal. However, various secondary operations such as bonding, drilling and screwing are sometimes required after an FRP part has been molded. Thus, the secondary operations detract from possible cost savings associated with the molded part.

SUMMARY OF THE INVENTION

Pursuant to the present invention a simple, low cost method is provided for securing external components to a molded structure. The method preferably utilizes a resin transfer molding technique where resin is injected into pieces of fiber reinforcement material which are held in a preselected configuration in a mold. A fastening device having a base and at least one depending finger is attached to the fibrous material such that an outer surface of the base lies substantially parallel to an outer surface of the fibrous material, with the finger extending therethrough. When the resin is injected it flows around the fingers. The resin cured secures the device in place so that it can be used to attach external components to the molded structure.

In the preferred embodiment, the fastening device has an integrally formed attachment member or tab which can be bent outwardly after the part is removed from the mold. The tab can take a variety of different shapes depending upon the type of external component to be attached to the molded part.

BRIEF DESCRIPTION OF THE DRAWINGS

The various advantages of the present invention will become apparent to one skilled in the art after reading the following specification and by reference to the drawings in which.

DESCRIPTION OF THE PREFERRED EMBODIMENT

Figure 1:
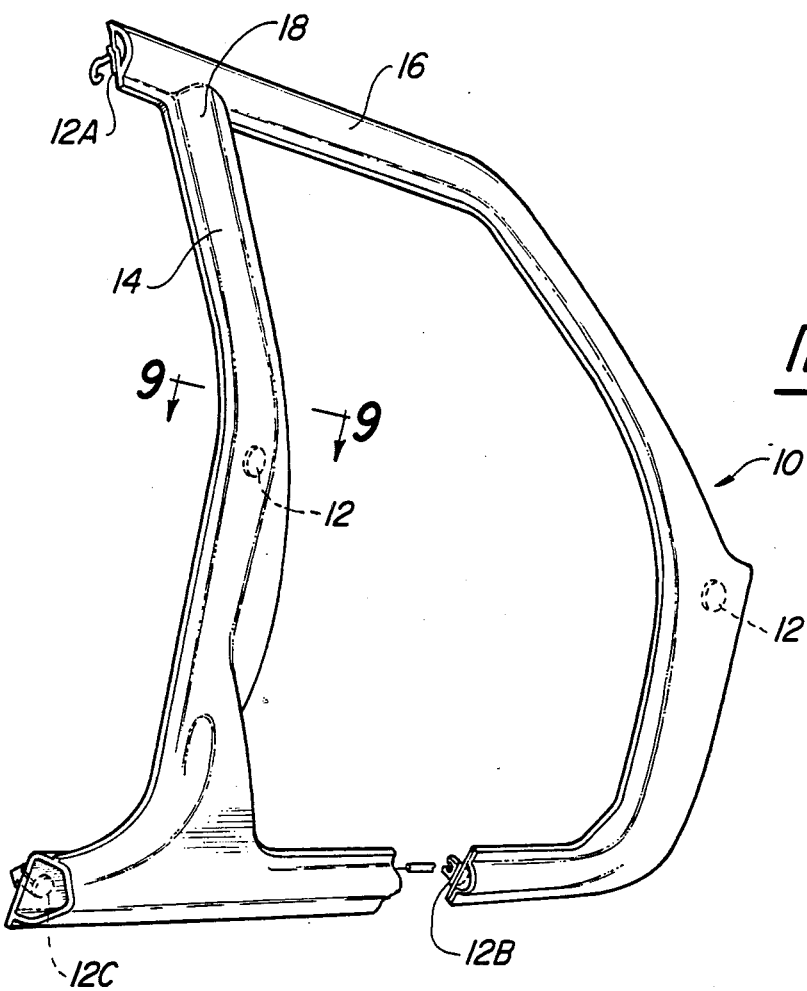
FIG. 1 is a perspective view of a molded part made in accordance with the teachings of the present invention.

It should be understood from the outset that while this invention will be described in connection with a particular example, that the scope of the invention need not be so limited since those skilled in the art will appreciate that its teachings can be used in a much wider variety of applications such as on parts found within the engine compartment (firewalls, wheel well covers, etc.) where many wires and hoses are found. With this caveat in mind the present invention will be described in connection with making an automotive door frame 10 having a plurality of fastening devices 12 located at various locations thereon. As can be seen in the drawings, door frame 10 has a relatively complex shape having a plurality of members such as upright member 14 and cross member 16 that meet at a joint 18. Each of the members 14, 16 is hollow and asymmetrioal in cross section.

Figure 2:
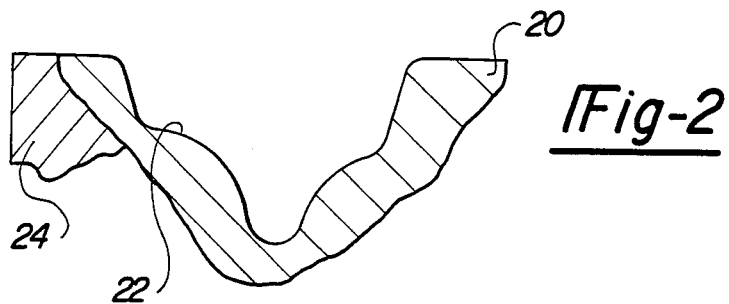
FIG. 2 is a cross sectional view of a lower mold die.
Figure 3:
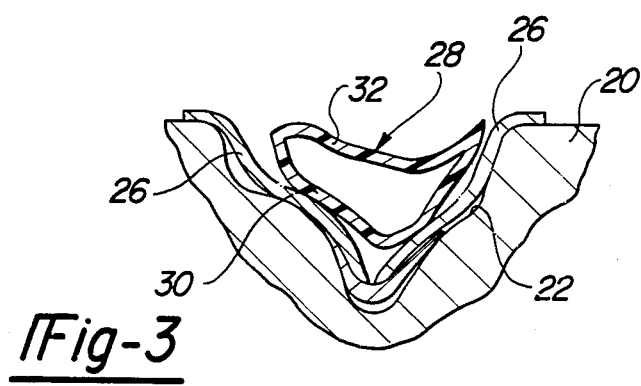
FIG. 3 is a cross sectional view illustrating fibrous pieces and an inflatable bladder in the lower mold die.

FIG. 2 illustrates a lower mold half or die 20 having an irregularly shaped inner surface 22 for defining the irregularly shaped outer surface of member 14. In this embodiment, the lower die 20 is mounted to a suitable fixed support 24. A plurality of dry fiber reinforcing material pieces are placed along the inner surface 22 of the lower die 20. As shown in FIG. 3, two pieces of fibrous material 26 are placed in the lower die 20 so as to line the inner surface 22. The use of a plurality of fibrous pieces lying laterally across the mold is preferred because multiple layers can be more easily formed to the complex geometry and can be locally tailored (i.e., multiple fiber orientations as well as increasing or decreasing the number of plies) to the loading distribution which varies from section to section. However, it should be understood that a single piece can also be used as can a preshaped preform without departing from the spirit of this invention.

A thin-walled, airtight and fluid impervious member is then placed over the fibrous pieces lining the lower mold 20. Preferably, the member is in the form of a bladder 28. Bladder 28 generally consists of a lower sheet 30 that conforms to the outline of the lower die cavity which has been seamed together to an overlying sheet 32. As will appear, the purpose of bladder 28 is to prevent resin from flowing into the interior portions of the mold thereby directing the flow of resin and defining the inner surface of the hollow member. The bladder 28 shown in FIG. 3 is shown in a collapsed form and is later filled with compressed air as will be discussed later herein. Instead of a deflatable/collapsible bladder a thin-walled core could be used that maintains its shape at all times. Compressed air could be used to ensure that such a thin-walled member will not collapse during the molding operation. Still other devices will become apparent to those skilled in the art.

Figure 4A:
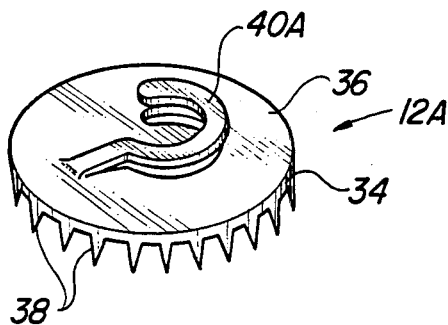
FIGS. 4(A-C) are perspective views of alternative embodiments of fastening devices that can be used in connection with the present invention.
Figure 4B:
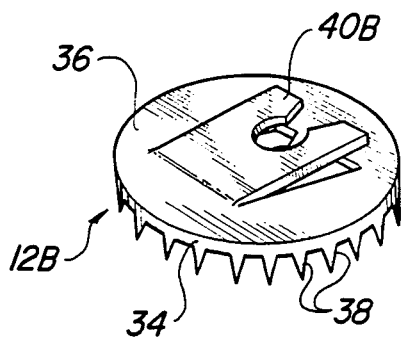
Figure 4C:
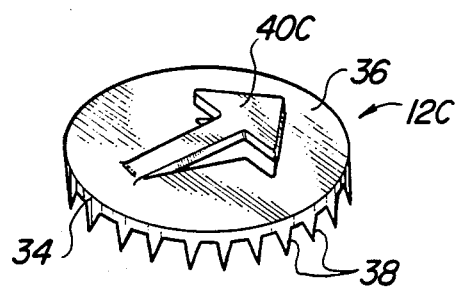

FIGS. 4(A-C) discloses three different embodiments of fastening devices which are generally designated by the numeral 12. To a large extent, each of the embodiments are the same and common reference numerals will therefore be used for like parts. Each of the fastening devices generally takes the form of a button having a base 34 with a generally flat outer surface 36. A plurality of teeth or fingers 38 extend transversely to surface 36 and are located about the periphery thereof. Integrally formed tabs 40(A-C) are cut out from base 34. The purpose of tab 40 is to provide a means of attaching external components such as hoses, electrical wiring, insulation and the like. Tab 40A takes the form of a hook which can be used for securing tubes. Tab 40B takes the form of a bifurcated clip which can be used for securing wires. Tab 40C is in the form is a spear which can be used for securing trim components. However, it should be understood that the tabs can take a variety of shapes. As will appear, the tabs 40 will be bent outwardly from the base 36 after molding of the part has been completed (see FIG. 1).

Figure 5:
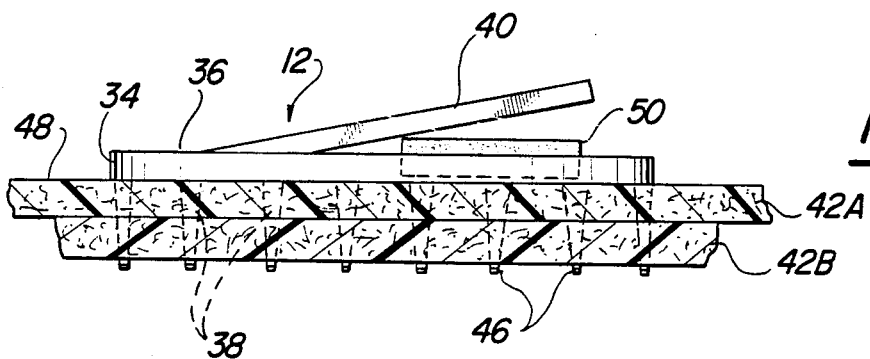
FIG. 5 is a cross sectional view illustrating a fastening device attached to two pieces of fibrous material.

As illustrated in FIG. 5, a fastening device 12 is attached to one or more pieces of fibrous material. Preferably, device 12 is attached by piercing the fingers 38 through the plies of fibrous material. In FIG. 5 two such plies 42A and 42B are shown. However, the remaining figures show only one ply in order to simplify the drawings. A variety of attachment methods can be used. However, one particularly advantageous method is to bend the ends 46 of the fingers 38 at a substantially right angle to their major axes. This can be accomplished in a manner similar to the operation of a stapler whereby the ends of the fingers are pressed against cup-shaped recesses in a receiving member (not shown) which tend to bend the ends 46 at an angle thereby locking the fastening device in place. The fastening device 12 is attached so that its flat outer surface 36 is generally parallel to the outer surface 48 of the outermost ply of fibrous material.

Some provision is preferably made for facilitating the subsequent bending of the tab 40 after the molding operation. This can also be accomplished in a variety of manners. One such technique is to include a piece of resilient closed cell foam material 50 between the tab 40 and fibrous material outer surface 48. The foam insert 50 should have the same outline as the shape of the tab 40 and be sufficiently resilient so that the tab can be pressed downwardly flush with surface 36 during molding, yet the foam should have sufficient strength to urge the tab 40 upwardly when no longer pressed by the mold die.

An alternate embodiment would include a sheet of release film or a coating on the entire underside surface of base 36. Such measures would prevent resin from bridging the cuts between the tab and the remainder of the base which could hold the tab downwardly and make it more difficult to pry upwardly.

Another approach is to make the device 12 from a thermoplastic material with the tab 40 being initially molded at an angle about the same as shown in FIG. 5. When the mold is closed, the pressure between the dies will close the tab. After the part is removed from the mold, the internal stress or memory in the tab will return it approximately to its original position which allows it to be opened further as necessary to connect an external component to it.

Figure 6:
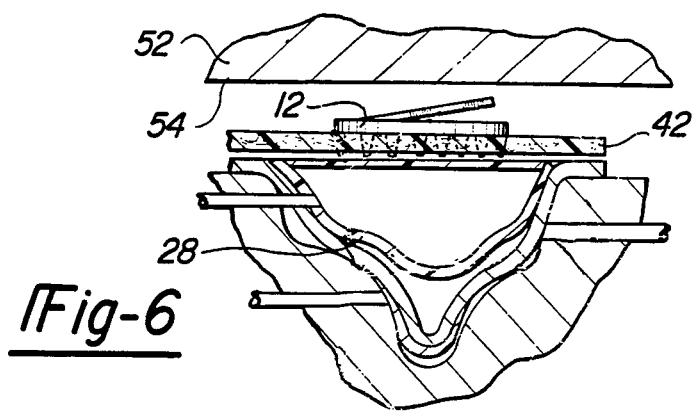
FIGS. 6-8 are cross sectional views illustrating sequential steps in the method of the present invention.

Turning now to FIG. 6, the fibrous material 42 is shown laid across the cavity defined by the lower die 20 and on top of the bladder 28. The mold includes an upper die 52 having a surface 54 which will correspond in shape to the desired surface configuration for the surface opposite that defined by the lower mold die surface 22. Note that lower die surface 28 is irregularly shaped and different in configuration than surface 54 in the upper die and that the dies cooperate to define a structure that has an asymmetrical cross section.

Figure 7:
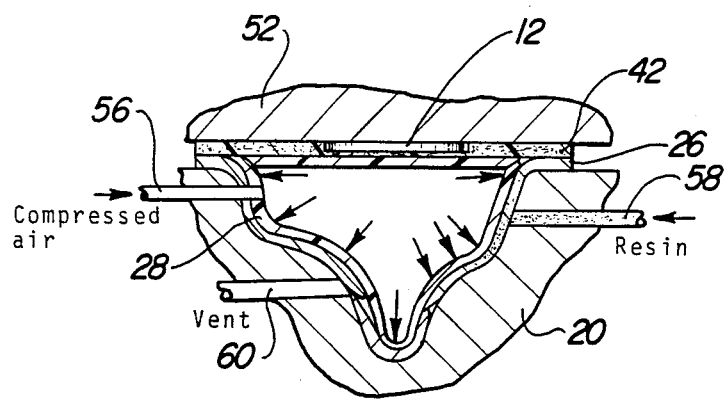

In FIG. 7 a source of compressed air is connected via a suitable conduit 56 extending through the lower die 20 and into the bladder 28. The purpose of the compressed air is to expand the bladder 28 (if it is expandable) and to maintain the shape of it during the subsequent resin injection step. Otherwise, the thin-walled bladder could collapse under the pressure of the resin.

Figure 8:
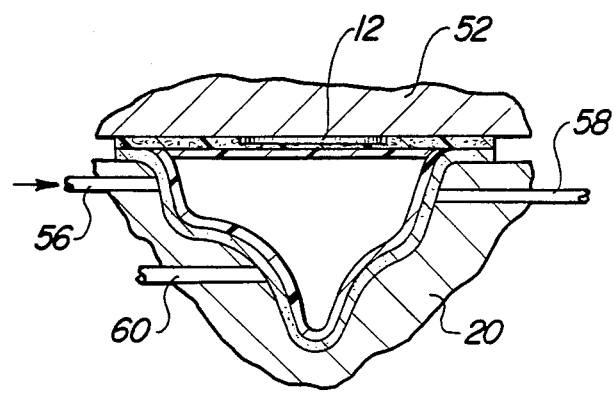

The resin is shown in FIG. 7 as beginning its flow through conduit 58 and into the fibrous material whose outer surfaces are defined by the now closed mold dies 52 and 20. Preferably, an air vent 60 is provided that permits escape of air from the fibrous material thereby preventing the formation of voids and other undesirable characteristics. FIG. 8 illustrates the mold after all of the dry fibrous material has been impregnated with the liquid resin. The mold remains closed until the resin cures and the resultant structure becomes rigid. Curing can be carried out under heat and pressure or it can be done at room temperature depending upon the resin and its chosen catalyst. In this example, the resin is vinyl ester although polyester, epoxy and urethane resins should prove to be acceptable.

Figure 9:
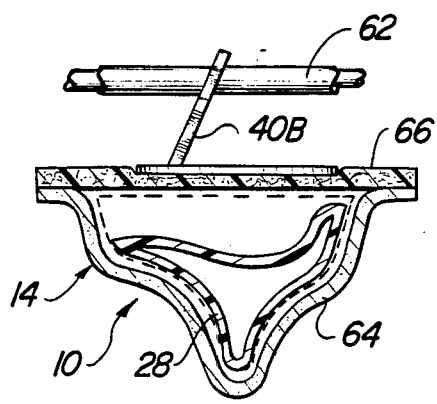
FIG. 9 is a cross sectional view taken along the lines 9—9 of FIG. 1 showigg the fastening device securing an electrical wire.

After the resin has cured, the part (here door 10) is removed from the mold and the compressed air source is disconnected from the bladder 28. Thus, the bladder tends to collapse somewhat as illustrated in FIG. 9. Since the bladder is of such light weight and economical construction, there is no need to remove it from the ultimate part, although provision could be made for doing so if desired. The door 10 thus has a plurality of fastening devices 12 formed integrally therewith and located at preselected locations. When it is desired to connect external components to the door 10 the tabs 40 are bent outwardly to a sufficient angle that permits easy attachment to the external components. In FIG. 9, the tab is of the type shown in FIG. 4B and it is used to hold a wire 62. The other tab shapes can likewise be used for attaching different components.

Note that the preferred resin transfer molding technique of the present invention enables the user to manufacture complex parts. For example, the member 14 is illustrated in FIG. 9 as having an irregularly shaped surface 64 which is spaced from and different in configuration than the opposite surface 66. The member 14 and cross member 16 are joined at joint 18 which is likewise hollow, yet provides good mechanical strength between the member 14 and 16.

It should be understood that various modifications of the preferred embodiment can be used. For example, the broad teachings of this invention are applicable to a fastening device substantially the same as shown in FIG. 4 except that it does not have the bendable tab 40 cut out therein. The size of the base 34 is chosen large enough so that if it is mislocated in the molding process that there is sufficient surface to effect a semi-structural mounting. The flat base of the fastening device can be used to connect structural components to the door. For example, a threaded or unthreaded stud can be located very accurately by a robot with fusion welding used to attach the stud to the button head, provided the button is made of thermoplastic material. Conventional stud welding can be used if the button is made of metal.

Still other modifications will become apparent to those skilled in the art after a study of the specification, drawings and following claims.

What is claimed is:

1. In a method of molding a part where resin is injected into at least one piece of fibrous reinforcement material held in a mold, the improvement which comprises:
   (a) attaching a fastening device having a base and at least one finger to said at least one piece of fibrous material such that an outer surface of the base lies substantially parallel to an outer surface of the piece, with the finger extending through the piece to an inner surface thereof;
   (b) injecting resin into the mold causing the resin to impregnate the fibrous material and to flow around the finger;
   (c) using the finger to hold the fastening device in place during step (b);
   (d) curing the resin to form a mold structure with the fastening device lying on an outer surface thereof; and
   (e) removing the part from the mold whereby the fastening device can be used to attach external components to the part.

2. The method of claim 1 wherein the fastening device includes a plurality of fingers, with the method further comprising the steps of:
   piercing the piece of fibrous material with the fingers; and
   bending ends of the fingers thereby locking the device in place.

3. The method of claim 1 which further comprises:
   forming an attachment member in a face of the fastening device; and
   bending the member outwardly after the part is removed from the mold.

4. The method of claim 3 which further comprises:
   placing a resilient insert between the attachment member and the piece of fibrous material whereby to facilitate bending of the attachment member.

5. The method of claim 4 wherein the insert has a similar outline as the attachment member.

6. The method of claim 5 wherein the insert is made of foam.

7. The method of claim 3 which further comprises:
   placing a release film between the base and the piece of fibrous material.

8. A method of making a hollow molded structure, said method comprising:
   providing a mold having an upper die and a lower die with upper and lower surfaces respectively defining the shape of molded structure;
   attaching a fastening device to at least one piece of dry fibrous material, the fastening device having a base and a plurality of fingers projecting from the base extending through at least one piece of fibrous material;
   bending ends of the fingers to lock the fastening device in place on the fibrous material;
   placing said fibrous material into the mold so that the fastening device faces one of the die surfaces;
   inserting a bladder between the die surfaces;
   closing the mold dies;
   applying compressed air to the bladder;
   injecting resin between the bladder and die surfaces to impregnate the fibrous material;
   curing the resin;
   opening the mold;
   removing the structure from the mold; and
   attaching an external component to the fastening device.

9. The method of claim 8 which further comprises:
   cutting a tab into the base of the fastening device;
   lifting the tab outwardly from the base after the structure has been removed from the mold; and
   attaching the external component to the tab.

10. The method of claim 9 wherein the tab is used to connect external components selected from the group comprising electrical wiring, hoses, trim components and insulation.

11. The method of claim 9 which further comprises:
    preventing resin from contacting the tab thereby facilitating its bending outwardly when used to connect the external components.

12. The method of claim 11 which further comprises:
    placing a resilient insert between the tab and an outer surface of the at least one piece of fibrous material.

13. The method of claim 10 wherein said molded structure has an asymmetrical cross section and first and second sections connected together in different directions at a joint, at least one mold surface of one mold die having an irregular configuration which is different from that of the opposite surface in the other mold die.

14. The method of claim 8 wherein the bladder is collapsible, with the compressed air being used to inflate the bladder against inner surfaces of the fibrous materials.

* * * * *